United States Patent [19]

Olschewski et al.

[11] Patent Number: 4,611,932
[45] Date of Patent: Sep. 16, 1986

[54] BEARING BUSHING FOR UNIVERSAL JOINTS

[75] Inventors: Armin Olschewski, Schweinfurt; Bernhard Bauer, Hassfurt; Elisabeth Zirk, Dittelbrunn, all of Fed. Rep. of Germany

[73] Assignee: SKF Kugellagerfabriken GmbH, Schweinfurt, Fed. Rep. of Germany

[21] Appl. No.: 680,987

[22] Filed: Dec. 13, 1984

[30] Foreign Application Priority Data

Dec. 17, 1983 [DE] Fed. Rep. of Germany ... 8336276[U]

[51] Int. Cl.⁴ .......................... F16L 33/78; F16D 3/41
[52] U.S. Cl. ...................................... 384/481; 277/82; 277/95; 464/131
[58] Field of Search ........................ 277/53, 55, 56, 82, 277/84, 94, 95; 384/130, 139, 140, 144, 151, 153, 477, 480, 481, 482; 464/128, 130, 131

[56] References Cited

U.S. PATENT DOCUMENTS

| | | |
|---|---|---|
| 1,872,251 | 8/1932 | Cowin .................................. 384/480 |
| 2,281,905 | 5/1942 | Young .............................. 384/480 X |
| 3,906,746 | 9/1975 | Haines ............................. 384/482 X |
| 4,094,518 | 6/1978 | Cox ........................................ 277/95 |
| 4,106,781 | 8/1978 | Benjamin et al. ..................... 277/82 |
| 4,385,789 | 5/1983 | Batt ..................................... 384/482 |

Primary Examiner—Stuart S. Levy
Assistant Examiner—David Werner
Attorney, Agent, or Firm—Eugene E. Renz, Jr.

[57] ABSTRACT

In combination, a bearing bushing for universal joints of generally cup-like form, a sealing ring for sealing a space between the bearing bushing and a shoulder of a machine part supported in the bushing, a circumferentially extending radially inwardly directed flange at the open axial end of said bearing bushing defining an annular interior recess, said sealing ring having a radially outwardly directed circumferential projection engaging in said annular recess interiorly of said flange, and means defining at least one axial opening in said sealing ring defining a passage connecting the running space of the bearing with an annular space outboard of the flange bounded by said flange and sealing ring.

1 Claim, 1 Drawing Figure

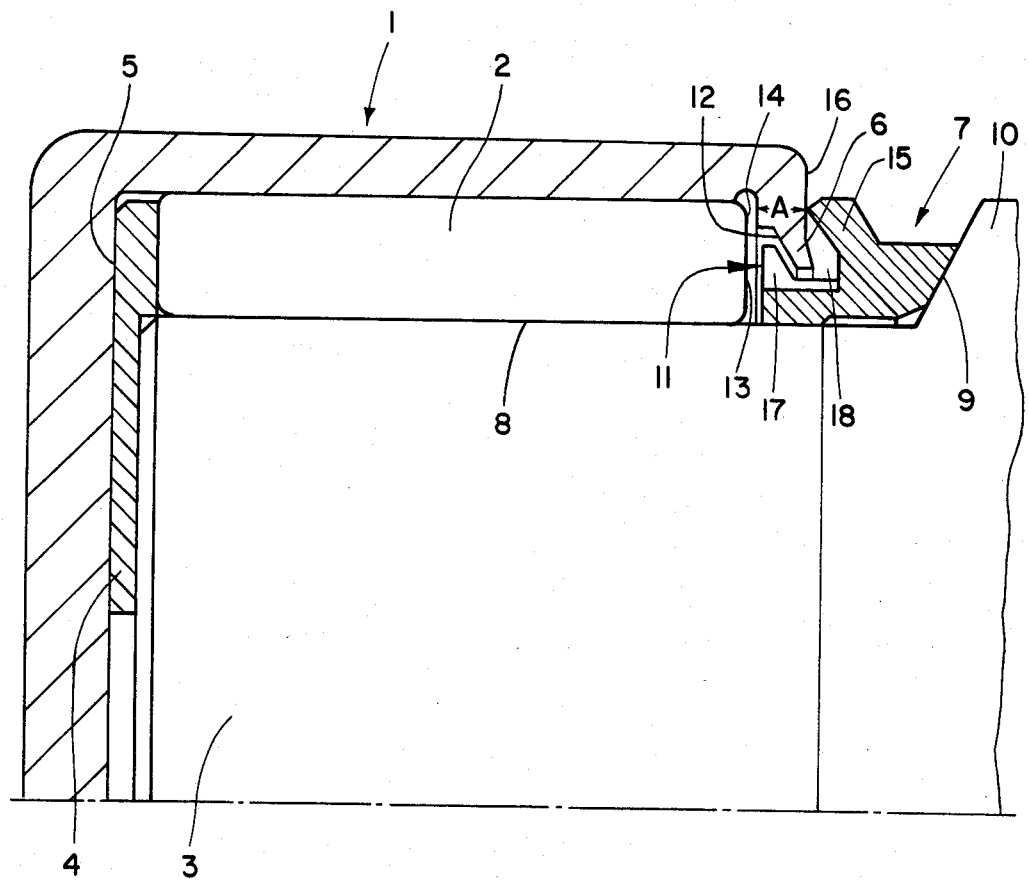

BEARING BUSHING FOR UNIVERSAL JOINTS

BACKGROUND OF THE INVENTION

The present invention relates to bearing bushings for universal joints.

More specifically the present invention relates to improvements in bearing bushings generally for universal joints generally of the type having a sealing ring located between the bearing bushing and a shoulder of a machine part supported in the bushing, the sealing ring engaging behind a flange of the bearing bushing by means of a radially outwardly directed circumferentially extending projection.

Bearing bushings of this general type are not new per se, for example, as exemplified in West German Offenlegungsschrift No. 2,144,172. In this bearing bushing assembly, the sealing ring is provided with a circumferentially extending collar which engages behind a flange or shoulder of a bearing bushing so that the two parts form an integral unit for installation purposes. This known design has several disadvantages and drawbacks. For example, in this assembly, the rolling elements engage relatively soft sealing rings or separate disks. Additionally, as a practical matter, it is impossible to relubricate the bearings in this design since it is very difficult to force the lubricating grease through the gap between the sealing ring and the bearing.

SUMMARY OF THE PRESENT INVENTION

With the foregoing in mind, it is an object of the present invention to provide a new and improved bearing bushing assembly wherein the rolling elements run on a flange of the bearing bushing and which is characterized by a novel seal arrangement permitting relubrication of the bearing with comparative ease. To this end the open end of the bearing cup is provided with a circumferentially extending radially inwardly directed flange on the running space side which, in the preferred embodiment, is angularly disposed and defines a circumferentially extending recess in which the radially outwardly directed circumferential projection of a sealing ring engages. The outwardly directed circumferential projection of the sealing ring is provided with at least one axially extending groove or opening which connects the running space of the bearing with an annular circumferentially extending space bounded by the radially inwardly directed flange on the running space side of the bushing and sealing ring. By this arrangement the bearing bushing and sealing ring form an integral unit and the axial end faces of the rolling elements run along a projecting radial face of the bushing flange. Further, when it is desired to relubricate the bearing, the spent grease lubricant is simply purged through the opening in the annular space which forces the sealing lip radially outwardly to permit escape of the spent lubricant. This groove and seal arrangement also permits release of any air which is compressed when the bearing bushing and sealing ring are assembled on the pin or trunnion of a universal joint.

In accordance with an additional feature of the present invention, the sealing ring is provided with a flexible elastic sealing lip engageable with the outer face of the bearing bushing flange at its open end, that is the face of the flange facing away from the rolling elements which lip normally bears against the outer surface of the flange under pretension. This provides an effective seal. It is noted, however, that when the bearing bushing, the complement of rolling elements and sealing ring is lubricated and assembled onto the journal of the universal joint, the elastic sealing lip is displaced relative to the end surface of the bearing bushing so that any used or spent grease or compressed air can escape to the ambient atmosphere.

DESCRIPTION OF THE DRAWINGS

These and other objects of the present invention and the various features and details of the operation and construction thereof are hereinafter more fully set forth with reference to the accompanying drawing, wherein:

FIG. 1 is a transverse sectional view of a bearing bushing in accordance with the present invention.

DESCRIPTION OF THE PREFERRED EMBODIMENT

Referring now to the drawing, there is illustrated a bearing bushing 1 of generally cup-like form rotatably mounted on the journal or pin 3 of a universal joint by a plurality of cylindrical rolling elements 2. As illustrated, the rolling elements engage at one axial end, an end plate 4 made of a material having good sliding properties such as Teflon which as illustrated lies against the bottom surface 5 of the bearing bushing 1 and serves to support the journal 3 in an axial direction. The bearing bushing 1 is provided at its open outer end with a radially inwardly directed flange 6 and this end, as illustrated, is sealed by means of a sealing ring 7 mounted on the trunnion 3 and in sealing relation with the flange 6. Sealing ring 7, which is made of an elastic material such as rubber, is mounted on a cylindrical portion 8 of the trunnion 3 and has a frusto-conical end face 9 which bears against a shoulder 10 of the universal joint. The sealing ring 7 has a radially outwardly directed circumferentially extending projection 11 at its inner axial end which confronts the axial end face of the rolling elements 2. This projection 11 nests in an annular recess 12 defined by the inner axial end face of the flange 6 and in this manner the bearing bushing 1 and sealing ring 7 form an integral unit. Note also that by this arrangement the outer axial end faces 13 of the rolling elements 2 run along a radial projection 14 of flange 6 which projects radially inwardly beyond the outer peripheral surface of the bushing 1 defining the outer raceway surface for the rolling elements 2. The wall thickness A of flange 6 and the formation of the circumferentially extending recess 12 can be accomplished by step-wise stretching of the border of the sleeve before the flange 6 is bent over. The seal 7 also includes an outer circumferentially extending sealing lip 15 which bears under pretension against the lateral outer surface 16 of the flange 6 on the side facing away from the rolling elements 2. As illustrated, the sealing 7 is provided with at least one axially extending opening which extends from the inner axial end face of the projection 11 to the base of the sealing lip 15 thereby connecting the interior space of the bearing bushing 1 with an annular space bounded by the sealing ring 7 and flange 6. By this arrangement, when the bearing is relubricated the spent lubricating grease is forced through the axial opening 17 into the annular space 18. Accumulation of the spent grease in this zone deflects the sealing lip 15 upwardly permitting the spent grease to be purged to the ambient atmosphere. It is also noted that air which may be compressed when the bearing bushing, rolling elements and sealing ring 7 are assembled as a unit on the trunnion 3 can also escape through the axial opening 17 in the manner described above.

While a particular embodiment of the present invention has been illustrated and described herein, it is not intended to limit the invention and changes and modifications may be made therein within the scope of the following claims. For example, instead of a single large axial opening 17, the sealing ring may be provided with a series of circumferentially spaced smaller axial openings spaced circumferentially around the projection 11.

What is claimed is:

1. In combination, a bearing bushing for universal joints of generally cuplike form, a sealing ring for sealing a space between the bearing bushing and a shoulder of a machine part supported in the bushing, said machine part having a trunnion rotatably journalled in the bushing by a plurality of rollers in the space between the trunnion and interior of the bushing, a circumferentially extending radially inwardly directed flange at the open axial end of said bearing bushing defining an annular interior recess, said flange having a radially inwardly projecting abutment surface engageable by the axial ends of the rollers, said sealing ring having a radially outwardly directed circumferential projection engaging in said annular recess interiorly of said flange and spaced axially from the ends of the rollers a greater distance than said abutment surface, and means defining at least one axial opening in said sealing ring defining a passage connecting the running space of the bearing with an annular space outboard of the flange bounded by said flange and sealing ring, an elastic circumferentially extending outer sealing lip which bears against the lateral outer surface of said flange facing away from the rolling elements and engages said flange with a predetermined pretension and biases the seal in a direction away from the rolling elements.

* * * * *